Aug. 14, 1945.  V. KINSER  2,382,424
STEERING STABILIZER
Filed Sept. 11, 1942
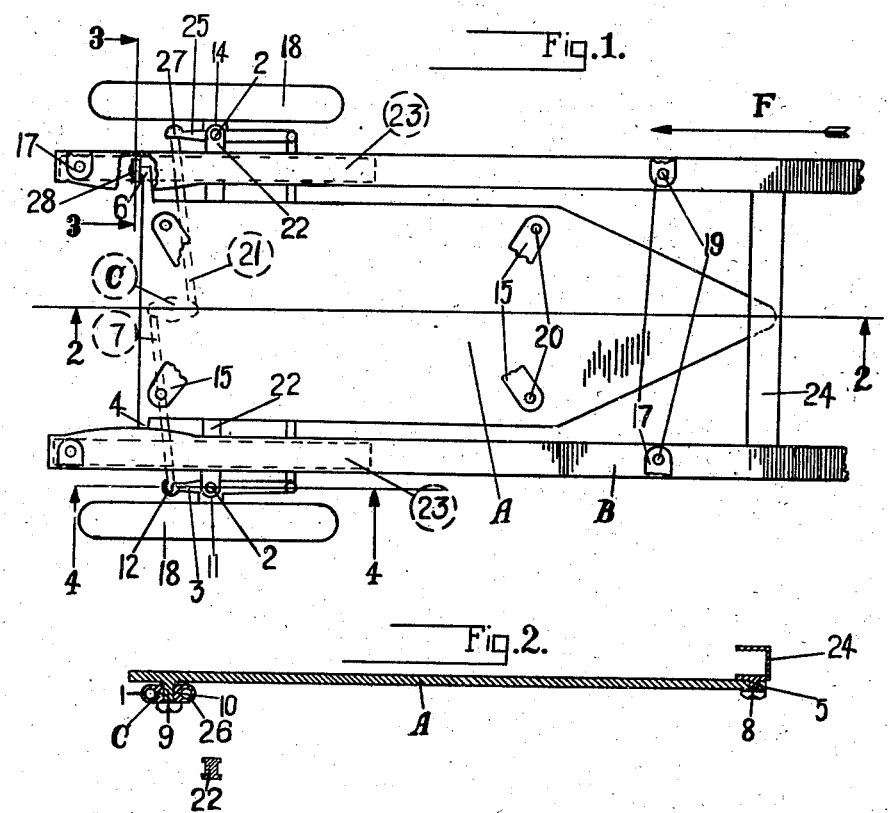
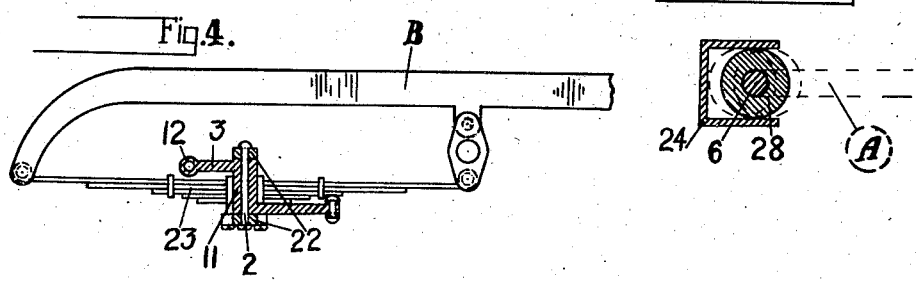
INVENTOR
Vernon Kinser Patented Aug. 14, 1945

2,382,424

UNITED STATES PATENT OFFICE 2,382,424

STEERING STABILIZER

Vernon Kinser, Butterfield, Mo.

Application September 11, 1942, Serial No. 457,921

2 Claims. (Cl. 280—89)

This invention relates generally to all such devices which are disposed to stabilize the steering especially of automobiles though not exclusively.

By a steering stabilizer, I have specific reference to a mechanism so constructed as to eliminate the unstabilizing effects of side winds, varying air pressures, and all such unequal pressures derived from the air which tend to impede the steering of automobiles.

More specifically, my invention relates to a steering stabilizer, so constructed as to provide an automobile with a steering response irrespective to lateral thrusts of the body of the automobile, which, heretofore, have been manually counteracted in the steering of an automobile by means of the steering wheel. Such manual counteractions, however, especially in heavy side winds, is a very tiresome and tedious operation and sometimes requires the driver to exert considerable effort and expedience in order to maintain steering stability.

My present invention has hence for its prime object the provision of connections between the parts of an automobile and the front wheels thereof wherein any tendency of the body of the automobile to move laterally with respect to the front wheels, which normally would have influence in the steering thereof, will have no steering influence, and, yet, so connect some of the other parts of the automobile to the front wheels for steering response of the automobile.

In the accompanying drawing (one sheet)—

Figure 1 is a longitudinal view of the frame B of the automobile in fragment showing the support-member A assembled, the view being taken from the top of the automobile;

Figure 2 is a longitudinal sectional view, taken approximately on the line 2—2 Figure 1;

Figure 3 is a sectional view, approximately on the line 3—3 Figure 1, showing one of the rollers 11 in engagement with the walls of the frame B; and Figure 4 is a part sectional view, taken approximately on the line 4—4 Figure 1.

Referring now more in detail and by reference characters to the drawing, which illustrates a preferred embodiment of my invention, the support-member A on one end is provided with a bore 5 suitably, as on the trunnion 8 provided on the cross-bar 24 of the frame B, pivotally mounted with respect to the frame B, as best seen in Figure 2.

On the other end of the support-member A is provided a pair of trunnions 4, 6 disposed suitably and having the rollers 28 mounted thereon for engagement with the walls of the frame B so as to provide means for lateral movement of the frame B with respect to the support-member A.

The motor 15 of the automobile, preferably, as in this case, is mounted on the support-member A (fragments of the motor 15 being shown) in any suitable manner, as by rivets 20. It may be here said that modern automobile motor mountings are generally flexible so as to eliminate vibration. As is usual in the construction of automobiles the body 17 (fragments of the body 17 being shown) is rigidly affixed or secured to the frame B of the automobile by any number of securing elements such as rivets 19, the arrow F points to the front of the automobile, best seen in Figure 1.

In the usual manner, the frame B is flexibly suspended on the front wheels 18 of the automobile by means of the springs 23, which are disposed suitably between the frame B and the front axle 22 of the automobile. The front axle 22 is pivotally connected to the steering-knuckles 11, 14 of the automobile by means of the king pins 2 also in the usual manner, though, in this case, the king pins 2 are vertically disposed, as may be said, for casterless steering response of the automobile to the body 17 of the automobile.

In modern automobiles, however, the customary suspension is by connections known as knee-action, two types, the wishbone type and the dubonett type, being used most extensively. Yet, the older methods of suspension, one of which is shown, may be used, though, some such methods are disposed to use radius rods. The radius rods, if used, could be connected to either the support-member A or the frame B, in any suitable manner.

For pivotally supporting the link C, the same is provided with a bore 10 for embracing a suitable trunnion 9, provided on the support-member A suitably, also best seen in Figure 2.

One end of the link C is connected to the steering-knuckle 11 of the automobile by means of a rod 7 the respective ends thereof being connected to the end of the link C and the arm 3, which is provided on the steering-knuckle 11, by means of the ball-and-socket connections 1, 12, respectively. In a similar manner, the other end of the link C is connected to the steering-knuckle 14, which is provided with the arm 25, by means of the rod 21, being connected to the link C and the arm 25 by means of the ball-and-socket connections 26, 27, respectively. The rods 7, 21 and the link C provide means whereby to connect the support-member A and the motor 15, as inertia means, to the steering-knuckles 11, 14 for steering response of the automobile.

In the construction of the conventional steering linkage of automotive vehicles, there is provided a certain angle of inclination between the king pin and the vertical, as is customary. Because of this angle of inclination or caster, as it is usually called, the entire front end of the vehicle is connected to the steering linkage of the vehicle for actuation thereof. The driver must necessarily shift the entire weight of the front end of the vehicle a slight amount but such a caster angle is regarded as essential in the steering of vehicles.

Thus, is noticed the familiar straightening out tendency or caster steering response of the vehicle while rounding curves. This same caster steering response of the vehicle must be counteracted on unlevel roads and in side winds but, usually, though not always, it acts to the advantage of the driver. So, it will be understood, in order to effect such a caster steering response of the vehicle the entire front end of the vehicle or at least some part of it, as inertia means, must be connected for actuation of the steering linkage of the vehicle, as, by the caster angle arrangement, used on all conventional vehicles.

As will be understood, in steering an automobile certain lateral thrusts caused by side winds and varying air pressures are transmitted from the body 17 of the automobile to the front wheels 18 in such a manner as to have influence on the steering response thereof, which is very undesirable. Such lateral thrusts are eliminated from steering influence by my steering stabilizer, since the king pins 2 are vertically disposed, as has been described, and, because of this vertical or casterless disposition of the king pins 2, the body 17 is in no way connected to the steering linkage of the vehicle for actuation thereof, and steering response of the vehicle with respect to the body 17 will be casterless. Side winds and varying air pressures, therefore, thrusting the body 17 of the vehicle can have no steering influence with respect to the steering linkage of the vehicle.

Such a casterless steering response of the vehicle with respect to the motor 15, however, is not effected; instead, the ball and socket connections 12, 27 are disposed with respect to the steering knuckles 11, 25 for actuation of the steering linkage of the vehicle by and with the motor 15, acting as inertia means for steering response of the vehicle in a similar manner to the way in which the entire front end of the vehicle acts in the conventional caster angle arrangement. Thus, the motor 15 must be shifted slightly in one direction or another during steering manipulation since the motor 15 is connected to the steering linkage of the vehicle for actuation thereof.

With the motor 15 connected to the steering linkage of the vehicle for steering response of the vehicle thereto, and the steering linkage of the vehicle, which includes the king pins 2, disposed for casterless steering response of the vehicle with respect to the body 17, all the advantages of caster steering response of the vehicle are effectively maintained. The vehicle will have the straightening out tendency while rounding curves, the inertia of the motor 15 will tend to maintain steering stability at all times, the steering effect of the motor 15 must be counteracted when driving on unlevel roads, and steering response of the vehicle will be the same as in conventional linkages excepting that side winds do not react upon the motor 15 and, therefore, have no steering influence.

In use and operation, it will be seen that my invention accomplishes its object, any tendency of the body 17 of the automobile to be influential with respect to the caster steering response of the automobile will be eliminated by my steering stabilizer. Yet all the desirable features of caster steering are effectively maintained in such a manner as to make the automobile remarkably easier to steer.

It will be understood that, if desired, various changes and modifications in the form, construction, arrangement, and combination of the several connections of the steering stabilizer may be made and substituted for those herein shown and described without departing from the nature and principles of my invention.

Having thus described my invention, what I claim and desire to secure by Letters Patent is:

1. In a steering stabilizer for vehicles of the kind described, in combination, a body, wheels, means for suspending said body on said wheels, said means including steering knuckles vertically disposed so as to prevent caster steering response of said vehicle with respect to said body, a motor support member, said motor support member mounted with respect to said body for lateral movement only, a link swingably mounted on said motor support member, and a pair of rod members operatively connecting the ends of said link respectively to said steering knuckles for actuation of said steering knuckles responsive to lateral thrusts of said motor support member.

2. In a steering stabilizer for vehicles of the kind described, in combination, wheels, first elements including a body, second elements including a motor support member, said second elements mounted with respect to said first elements for lateral movement only, and mechanism suspending and connecting said first and second elements to and on said wheels so as to prevent caster steering response of said vehicle to said first elements and so as to permit lateral thrust of said second elements to effect steering response of said vehicle, said mechanism including steering knuckles and yieldable means for suspending one of said first and second elements on said wheels and linkage for connecting the other of said first and second elements to said steering knuckles.

VERNON KINSER.